US008756688B1

(12) United States Patent
Yuksel

(10) Patent No.: US 8,756,688 B1
(45) Date of Patent: Jun. 17, 2014

(54) METHOD AND SYSTEM FOR IDENTIFYING BUSINESS LISTING CHARACTERISTICS

(75) Inventor: Baris Yuksel, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/538,013

(22) Filed: Jun. 29, 2012

Related U.S. Application Data

(60) Provisional application No. 61/503,676, filed on Jul. 1, 2011.

(51) Int. Cl.
*G06F 21/00* (2013.01)
(52) U.S. Cl.
USPC ............... 726/22; 726/23; 709/206; 709/224
(58) Field of Classification Search
USPC ..................................... 726/22, 23
See application file for complete search history.

(56) References Cited

U.S. PATENT DOCUMENTS

| 7,068,998 | B2 * | 6/2006 | Zavidniak ............... 455/410 |
| 7,769,815 | B2 | 8/2010 | Wang et al. |
| 8,141,152 | B1 * | 3/2012 | Hwang et al. .......... 726/22 |
| 2002/0002552 | A1 | 1/2002 | Schultz et al. |
| 2003/0061211 | A1 | 3/2003 | Shultz et al. |
| 2004/0267886 | A1 * | 12/2004 | Malik ..................... 709/206 |
| 2005/0060643 | A1 * | 3/2005 | Glass et al. ............ 715/501.1 |
| 2008/0155693 | A1 | 6/2008 | Mikan et al. |
| 2010/0095377 | A1 | 4/2010 | Krywaniuk |
| 2010/0333200 | A1 * | 12/2010 | Chen et al. ................ 726/22 |

OTHER PUBLICATIONS

Li et al., "TTSF: A Novel Two-Tier Spam Filter," Proceedings on the Seventh International Conference on Parallel and Distributed Computing, Applications and Technologies, 2006, 6 pages.*
Shen, Guoyang, Liu, Tie-Yan, Song, Siji, Li, Hang, "Detecting Link Spam Using Temporal Information", Proceedings of the Sixth International Conference on Data Mining, 2006 IEEE.

* cited by examiner

*Primary Examiner* — Jason Lee
(74) *Attorney, Agent, or Firm* — Lerner, David, Littenberg, Krumholz & Mentlik, LLP

(57) ABSTRACT

Aspects of the disclosure provide for detection of spam attacks. In order to filter spam listings among business listings associated with a particular geographical region, a method and system operate to analyze the frequency of particular characteristics of the business listings, such as words within a listing title, phone numbers, or websites, to identify a normal frequency of each characteristic. Business listings may be periodically analyzed to identify anomalous increases in the frequency of particular characteristics. Characteristics that exhibit these anomalies may be identified as suspicious characteristics, and listings that contain suspicious characteristics may be identified as possible spam listings.

11 Claims, 6 Drawing Sheets

Frequency of particular characteristic
over time in geographic area

Frequency of particular characteristic
over time in geographic area

METHOD AND SYSTEM FOR IDENTIFYING BUSINESS LISTING CHARACTERISTICS

CROSS-REFERENCE TO RELATED APPLICATIONS

The present application claims the benefit of the filing date of U.S. Provisional Patent Application No. 61/503,676 filed Jul. 1, 2011, the disclosure of which is hereby incorporated herein by reference.

BACKGROUND

A strong web presence is vital to the success of modern businesses. In addition to the traditional marketing vehicle of a company web site, businesses are increasingly indexed with a variety of secondary sources. Examples of these secondary sources include search engines, mapping providers that provide directions to the place of business, review sites allowing users to rate their purchase experience, social networking sites that allow users to "link" to particular businesses to which they may be associated, and more. These secondary sources typically allow for business owners to make their business available via various searching and indexing methods. For example, a social networking site may allow a user to search for a particular type of business within a certain number of social "links" of the user, or a mapping provider may allow for the user to search for a particular business within a certain geographical radius.

However, by allowing business owners to submit their own businesses for listing, these secondary sites also provide an opportunity for malicious and opportunistic users to include false listings. While many business listing services are intended to provide users with the ability to find nearby businesses, malicious users may falsely identify the location of their business. For example, a taxi business may claim to be located near a busy street, when in fact they are located across town. Customers seeking nearby businesses may thus be misled and inconvenienced by these malicious users. Even worse, many of these listings may link to malicious software and function as virus delivery vectors. These false listings reduce the "signal-to-noise" ratio of search results and interfere with service usability.

BRIEF SUMMARY

A method and system as described identifies business listing characteristics. For example, one aspect of the disclosure provides a computer implemented method for identifying business listing characteristics. According to this method, a first frequency value of a business listing characteristic within a plurality of business listings may be determined over a first time period, and the first frequency value may be compared with a normal frequency value of the business listing characteristic. An anomaly in the first frequency value may be identified when a difference between the first frequency value and the normal frequency value is greater than a predetermined threshold. The business listing characteristic may be identified as a suspicious. In one example, the plurality of business listings may be associated with a particular geographical region.

Another aspect of the disclosure provides a processing system for identifying business listing characteristics. The processing system may include at least one processor and a memory coupled to the processor for storing a plurality of business listings. The processor may be configured to determine a frequency value for a characteristic associated with the business listings over a particular time period, identify an anomalous frequency value where a difference between a first frequency value and a normal frequency value is greater than a predetermined threshold, and in response to identifying the anomalous frequency value, identify the characteristic as a suspicious characteristic. The processor may be further configured to identify a business listing as spam based on the detection of the suspicious characteristic within the business listing.

Yet another aspect of the disclosure provides a non-transitory computer readable storage medium containing instructions that, when executed by a processor, perform a method. This method may include determining, using a computer processor, a first frequency value of a business listing characteristic within a plurality of business listings over a first time period, comparing the first frequency value with a normal frequency value of the business listing characteristic, identifying an anomaly in the first frequency value when a difference between the first frequency value and the normal frequency value is greater than a predetermined threshold, and identifying the business listing characteristic as a suspicious characteristic in response to identifying the anomaly.

DETAILED DESCRIPTION

Aspects of the disclosure describe a system and method for identification of business listing characteristics. The business listing server uses time series information to identify suspicious business listing characteristics. Business listings containing these suspicious characteristics may then be marked for further scrutiny to aid in the identification of spam business listings.

Aspects of the disclosure provide for a method and system for identifying spam business listings. The term "spam business listing" in the present context generally refers to business listings that attempt to manipulate a system to falsely drive traffic to particular websites and/or phone numbers that are not located where the business claims to be. The actual business is typically not located at the location specified in the associated business listing. For example, a taxi service may indicate that they are located at a particular busy intersection, when in fact they are located across town. Manipulating their business listing in this manner may cause the taxi service to be identified as the nearest service for a user searching for a taxi at the busy intersection. If a user were to call this taxi service, they would be forced to wait while their taxi comes from across town.

In some situations, spam listings are uploaded to a business listing server in bulk. These listings may inundate a particular geographical area with spam listings for a particular item. Special events, such as concerts and sporting events tend to attract this sort of attention from spammers. For example, when a popular band announces a tour date in a particular town, the business listings for that town may be inundated with listings of the title "Cheap <BAND NAME> Tickets." These listings are not associated with legitimate businesses. Rather, they attempt to drive traffic to ticket reseller websites and phone lines that do not have a physical presence in the geographic area to which they claim to be associated. As such, it is desirable to remove such listings from the business listing server, as the business listings for a particular area should reflect the businesses that are actually located in that area.

Aspects of the disclosure make use of the fact that such spammers tend to add numerous listings to a particular geographical area in a short period of time. These newly added listings generate a spike in the frequency of characteristics associated with the spam listings. For example, many of the "Cheap <BAND NAME> tickets" businesses may have the same or similar contact phone numbers, business titles, website addresses. Thus, sudden increases of the frequency of these terms may be used to identify suspect listings. By monitoring the frequency of characteristics of new business listings, aspects of the disclosure may identify anomalous frequency data, identify suspicious characteristics using the anomalous frequency data, and identify spam business listings using the suspicious characteristics.

Figure 1:
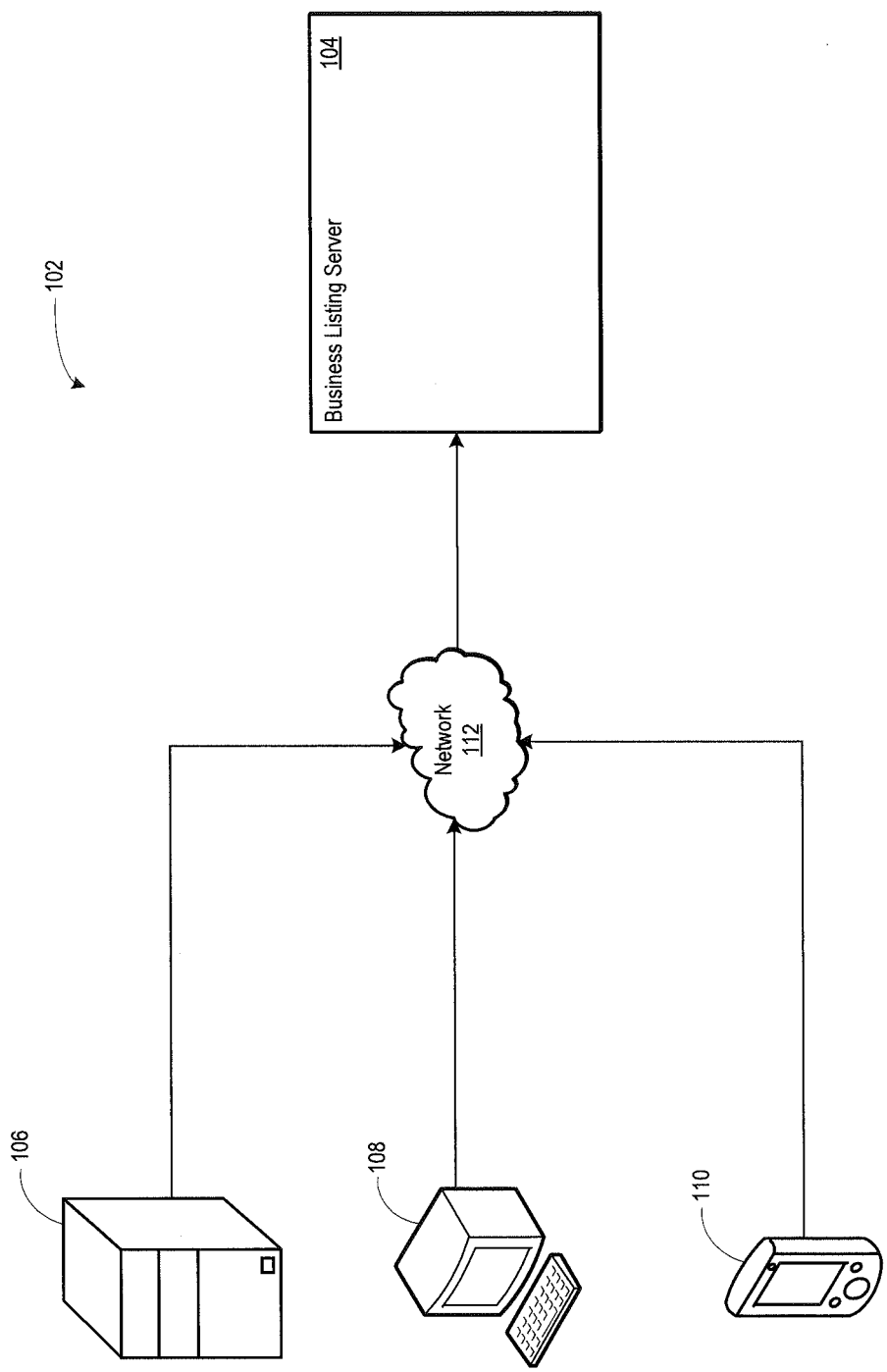
FIG. 1 is a pictorial diagram depicting an example of a system for providing business listings in accordance with aspects of the disclosure.

FIG. 1 illustrates one example of a system 102 for identifying business listings. The system 102 may include a business listing server 104 in communication with client devices 106-110 via a network 112. The business listing server 104 maintains listings which are associated with businesses. A business listing may include many different types of information about the business, such as the business' title (e.g., corporate business name ("Google, Inc."), informal business name ("Google"), etc.), the business's street address, the business's phone number, a URL for the business, a description of the business, hours of operation, or any other type of information about the business.

The client devices 106-110 may comprise many different types of client devices, and the business listing server 104 may provide business listings of a type and in a manner relevant to the type of client device. For example, an Internet search provider 106 operative to provide one or more search results may include a business listing provided by the business listing server 104. Where the client device 106 is an Internet search provider, the business listing server 104 may provide one or more business listings to the Internet search provider 106 in response to requests for those business listings. For example, the Internet search provider 106 may receive a search query from a user, and the Internet search provider 106 may communicate with the business listing server 104 to include one or more business listings in the search results that the Internet search provider 106 may provide to the user.

The client device 106 may also be a social network provider or a local search provider that communicates with the business listing server 104 to provide one or more business listings in response to queries that the client device 106 may receive from one or more users.

The client device 106 may alternatively be a map service provider or navigation assistance provider, where the information for one or more points of interest presented on a map provided by the client device 106 is based on one or more business listings provided by the business listing server 104. In other words, the client device 106 may be any system or other provider that communicates with the business listing server 104 to retrieve and/or request one or more business listings.

The business listing server 104 may also comprise an Internet search provider that provides one or more business listings to one or more end users, such as users using client devices 106-110. Moreover, the business listing server 104 may comprise any one or more of the aforementioned systems for providing business information to one or more end users, such as a map service provider, a local search provider, a social network provider, or any other type of Internet service.

The client devices 106-110 may include a desktop computer 108 in use by a user to conduct Internet searches using the business listing server 104. The desktop computer 108 may transmit one or more search queries to the business listing server 104 and, in response, the business listing server 104 may include one or more business listings in the search results sent to the desktop computer 108. As discussed below, the business listing information provided to the desktop computer 108 may include one or more Uniform Resource Locations ("URLs") for one or more websites associated with the business listings provided to the desktop computer 108. The user may select one or more of the URLs to visit the websites associated with the business listings. A website URL for a business listing is one of many different types of business listing information that the business listing server 104 may provide, and additional types of business information are discussed further below.

The client device 110 may be a mobile device 110, such as a laptop, a smart phone, a Personal Digital Assistant ("PDA"), a tablet computer, or other such mobile device. As with the desktop computer 108, the mobile device 110 may transmit one or more queries to the business listing server 104, such as search queries or navigation queries, and the business listing server 104 may incorporate one or more business listings in the response sent to the mobile device 110. Hence, whether the client devices 106-110 are systems 106 (e.g., Internet search providers, local search providers, social network providers, etc.), desktop computers 108, mobile devices 110 (e.g., laptops, smartphones, PDAs, etc.), the business listing server 104 may be operative to provide one or more business listings to the client devices 106-110 based on a request for the one or more business listings.

When a business listing is requested from the business listing server 104, the business listing server 104 may transmit a response that includes a complete business listing. The requesting party may parse the business listing to extract a subset of business information for the requesting party's use. For example, an Internet search provider may request a business listing from the business listing server 104 in response to an Internet search query by an end user. When the Internet search provider receives the business listing, the Internet search provider may then transmit the business' title and associated URL to the end user, rather than the complete set of business information that the Internet search provider initially received. Of course, the Internet search provider may provide the complete set of business information to the end user.

The business listing server 104 may be operative to transmit a select portion of the business listing to a requesting party. Using the Internet search provider example above, the business listing server 104 may receive a request for a business listing title and business listing URL, and based on this request, the business listing server 104 may transmit the business' title and associated URL to the Internet search provider. However, it should be understood that the examples above may also apply where the business listing server 104 communicates with the end user (e.g., client devices 108-110). Hence, the business listing server 104 is flexible and robust enough such that it may provide a complete business listing or a subset of the business listing, depending on the request that the business listing server 104 receives.

The network 112 may be implemented as any combination of networks. As examples, the network 112 may be a Wide Area Network ("WAN"), such as the Internet; a Local Area Network ("LAN"); a Personal Area Network ("PAN"), or a combination of WANs, LANs, and PANs. Moreover, the network 112 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol. Although only a few devices are depicted in FIG. 1, it should be appreciated that a typical system may include a large number of connected computers.

Communication between and within the business listing server 104 and the network 112 may be implemented using one or more interfaces, such as Web Services, or Enterprise Service Bus interfaces. Other examples of interfaces include message passing, such as publish/subscribe messaging, shared memory, and remote procedure calls.

The business listing server 104 may be at one node of a network 112 and be operative to directly and indirectly communicate with other nodes of the network. For example, the business listing server 104 may comprise a web server that is operative to communicate with the client devices 106-110 via the network 112 such that the business listing server 104 uses the network 112 to transmit and display information to a user via the client devices 106-110. The business listing server 104 may also comprise a plurality of computers that exchange information with different nodes of a network for the purpose of receiving, processing and transmitting data to the client devices. In this instance, the client devices 106-110 may be at different nodes of the network than any of the computers comprising the business listing server 104.

Figure 2:
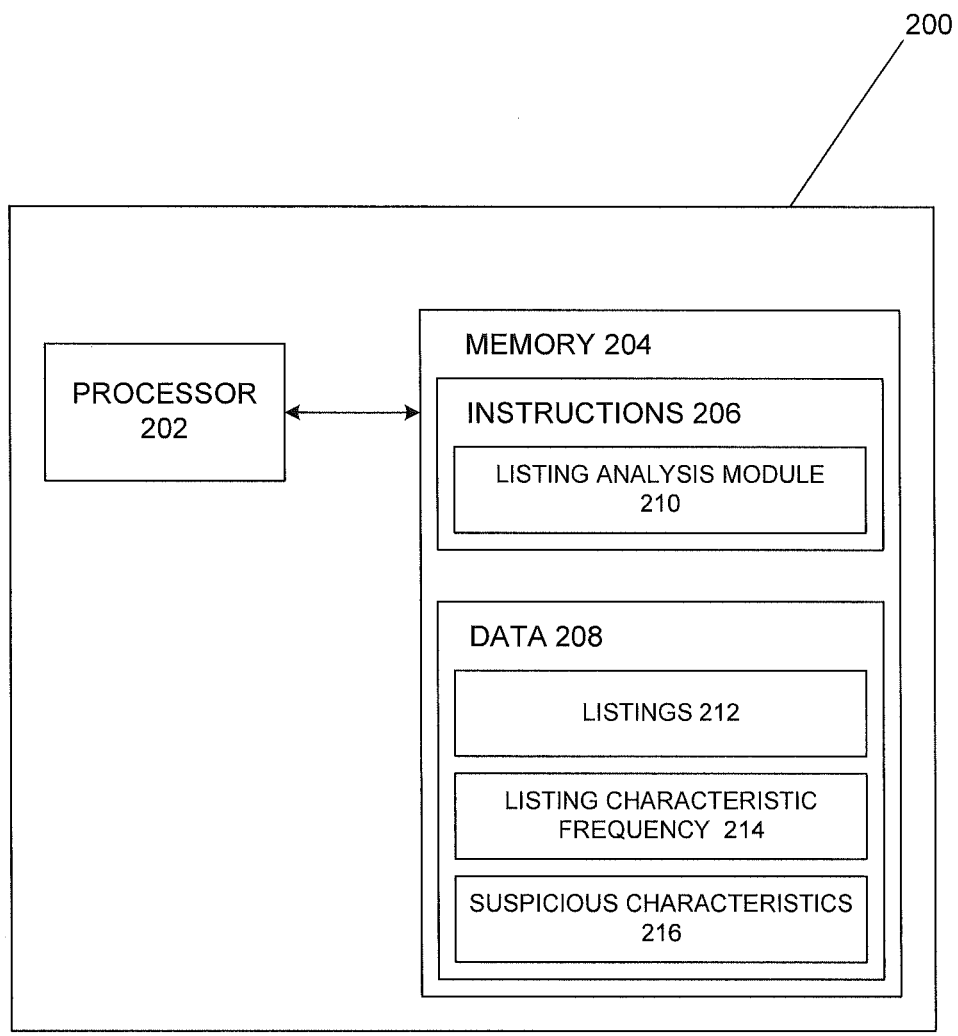
FIG. 2 is a block diagram depicting an example of a business listing server in accordance with aspects of the disclosure.

FIG. 2 depicts a business listing server 200, such as the business listing server 104. The business listing server 200 may include a memory 204 in communication with a processor 202. The memory 204 may be operative to store a listing analysis module 210, listings 212, a listing characteristic frequency 214, and suspicious characteristics 216.

Memory 204 may store information that is accessible by the processor 202, including instructions 206 that may be executed by the processor 202, and data 208. The memory 204 may be of any type of memory operative to store information accessible by the processor 202, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 206 may be any set of instructions to be executed directly (such as machine code) or indirectly (such as scripts) by the processor 202. For example, the instructions 206 may be stored as computer code on the computer-readable medium. In that regard, the terms "instructions" and "programs" may be used interchangeably herein. The instructions 206 may be stored in object code format for direct processing by the processor 202, or in any other computer language including scripts or collections of independent source code modules that are interpreted on demand or compiled in advance.

The instructions 206 may comprise a listing analysis module 210. The listing analysis module 210 analyzes the characteristics of business listings hosted by the business listing server to measure the frequency of various listing characteristics and to identify suspicious characteristics. The listing analysis module 210 may also utilize identified suspicious characteristics to determine whether a given business listing is a spam listing. Example methods by which the listing analysis module 210 may perform these functions are described further below (see FIGS. 5-7).

Although the example described herein describes the listing analysis module 210 as a distinct module, aspects of the disclosure may also provide similar functionality in a single module, or multiple modules. For example, the listing analysis module 210 may be integrated into a spam detection module comprising multiple methods of identifying spam listings, or it may be integrated into a listing hosting module for providing business listings in response to search queries. Aspects of the instructions 206 may be implemented as software executing on the processor 202 or by various hardware interfaces, such as ASICs, field-programmable gate arrays ("FPGAs"), etc.

The data 208 may be retrieved, stored or modified by the processor 202 in accordance with the instructions 206. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

Portions of the data 208 may comprise one or more listings 212, a set of listing characteristic frequency data 214, and a set of suspicious characteristics 216. The listings 212 comprise a set of business listings as described above. These business listings represent data describing one or more businesses. For a given business, the business listings 212 may store information about the business, such as the business's title, the business's phone number, the description about the business, the business's postal address, the URL for the business' website, the business's hours of operation, or other such business information. The business listings may be indexed by a geographic location. For example, the business listings 212 may be searchable by location to identify businesses in proximity to a user location.

The listing characteristic frequency data 214 comprises a set of data describing various characteristics of the business listings 212. For example, the listing characteristic frequency data 214 may be maintained in a tabular format, such as a spreadsheet, that tracks the number of times each particular characteristic appears in the business listings 212. The listing characteristic frequency data 214 may be further indexed by a time period, such as the frequency of each characteristic over a particular hour, day, week, month, or year. In some aspects, the listing characteristic frequency data 214 may be maintained as multiple sets of data, such as multiple spreadsheets, each associated with a particular geographic region, such as all listings within a town, city, county, state, zip code, or the like.

The set of suspicious characteristic 216 comprises business characteristics that have been identified by the listing analysis module 210 as suspicious due to anomalous data in the listing characteristic frequency data 214. An example of anomalous data is described further below (see FIG. 4). The set of suspicious characteristics 216 may be used by the listing analysis module 210 to identify spam business listings.

Although certain advantages are obtained when information is transmitted or received as noted above in FIGS. 1 and 2, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although FIG. 2 functionally illustrates the processor 202 and memory 204 as being within the same block, the processor 202 and memory 204 may actually comprise multiple processors and memories that may or may not be stored within the same physical housing. Accordingly, references to a processor, computer or memory will be understood to include references to a collection of processors, computers or memories that may or may not operate in parallel.

In addition, the business listing server 200 may be implemented with additional, different, or fewer components. As one example, the processor 202 and any other logic or component may be implemented with a microprocessor, a microcontroller, a DSP, an application specific integrated circuit (ASIC), discrete analog or digital circuitry, or a combination of other types of circuits or logic.

Logic, such as the instructions 206, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Figure 3:
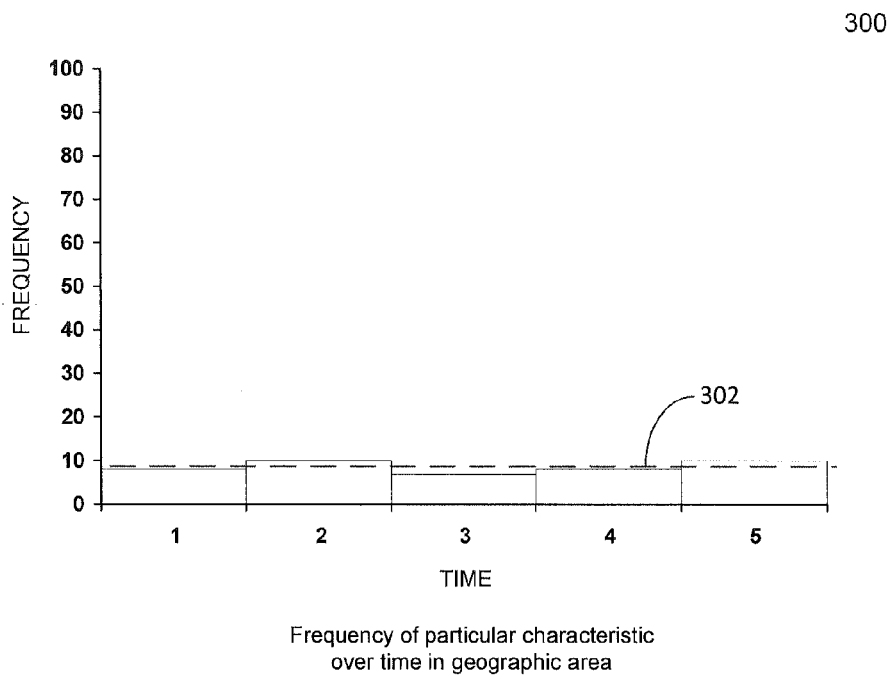
FIG. 3 is a bar graph depicting an example of a normal frequency of a particular characteristic over time in accordance with aspects of the disclosure.

FIG. 3 is a bar graph depicting an example of a normal frequency of a particular characteristic of a business listing as measured over a period of time in accordance with aspects of the disclosure. As used herein, the term frequency means a count. The graph depicts the frequency with which the particular characteristic appears in business listings added to the business listing server 104 over time. The characteristic may include a particular word or term within a business listing title, a phone number, a website URL, or any other identifying characteristic of the business listing.

The y-axis of the graph represents the frequency in which or the number of times the characteristic appears in newly added listings, and the x-axis represents the time period during which those listings were added. The numbers 1-5 along the x-axis may describe a particular hour, day, week, month, year, or any other time period for which data is gathered. The source data of the graph may also be associated with a particular geographical region, representing business listings added within that region. For example, the bar graph depicted in FIG. 3 may represent the number of times the term "Gaga" appears in business listings for the given geographical region during each time period. Over time, analysis of the frequency data may establish a "normal" or "usual" frequency of the term. This usual frequency may be defined by various statistical methods, such as by identifying a best-fit line across the bar graph. In the present example, the best-fit line 302 indicates the normal frequency of the characteristic for the data represented by the bar graph of FIG. 3. In some aspects, the frequency data is examined using a "moving window" where older data is deemed less relevant than newer data for the purposes of determining a "normal" or "usual" frequency for a particular term.

Figure 4:
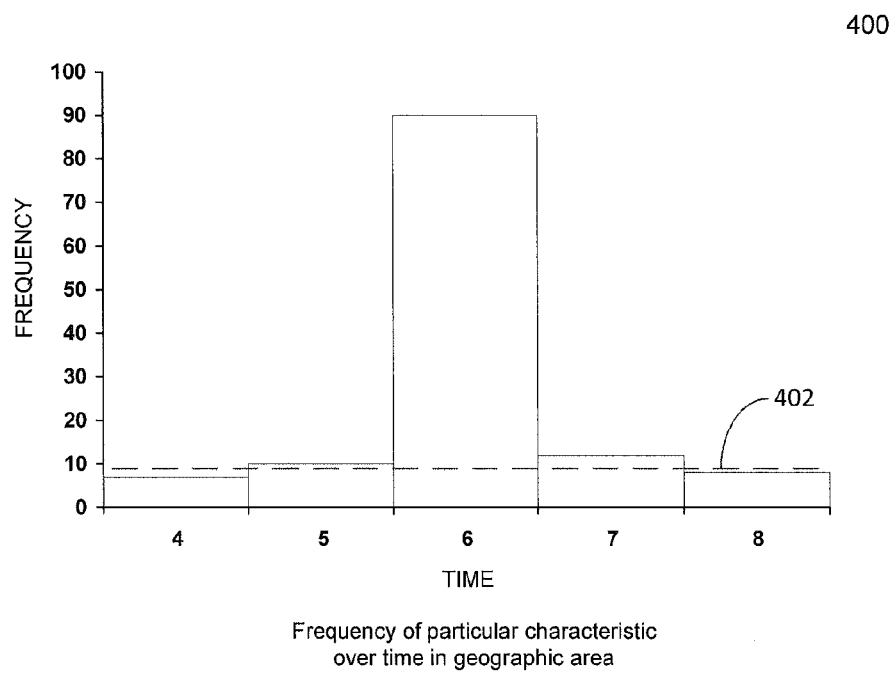
FIG. 4 is a bar graph depicting an example of an anomalous frequency of a particular characteristic over time in accordance with aspects of the disclosure.

FIG. 4 is a bar graph depicting an example of an anomalous frequency of the particular characteristic as measured over time in accordance with aspects of the disclosure. As with the bar graph described with respect to FIG. 3, FIG. 4 depicts the frequency of the same characteristic. The best-fit line 402 represents the "normal" frequency of the particular characteristic over time (e.g., as calculated from the data shown in FIG. 3). As can be seen from the graph, at time index 6, the frequency of the characteristic experiences a large increase, indicating that many businesses with this particular characteristic have been added to the business listing server 104 over this particular time period. For example, if a Lady Gaga concert has announced a tour date in the geographic region associated with the data, then spammers may target that region with spam business listings for "Lady Gaga tickets," "Cheap Lady Gaga tickets," and the like. These business listings do not correspond to actual business locations in the geographic region, and are intended solely to drive traffic to the spammer's businesses or clients. The sudden increase in frequency for this particular characteristic (e.g., "Gaga" in the listing title) may be sufficient to flag the characteristic as suspicious. For example, a characteristic may be identified as suspicious when the frequency value is more than two standard deviations from the established "normal" frequency, greater than a threshold variance value, or any other statistical method of identifying an anomalous value. Aspects of the system and method may employ a minimum threshold variance or standard deviation which is used to identify anomalous changes in frequency. Frequencies that experience a change greater than this threshold may be identified as suspicious.

Figure 5:
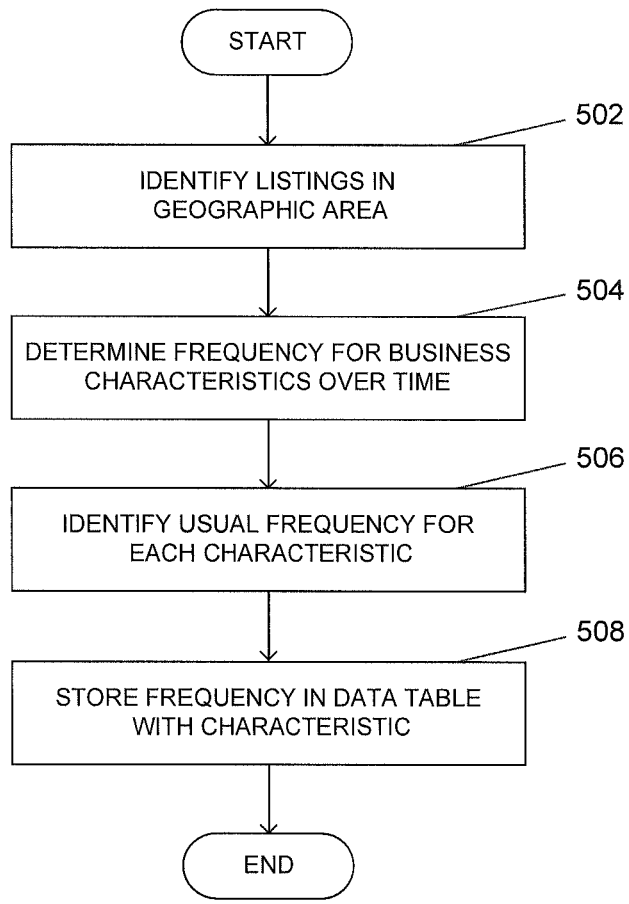
FIG. 5 is a flow diagram depicting an example of a method for storing frequency data for one or more business listings in accordance with aspects of the disclosure.

FIG. 5 is a flow diagram depicting an example of a method 500 for identifying and storing frequency data for one or more business listing characteristics in accordance with aspects of the disclosure. The method 500 operates to build a set of frequency data associated with business listing characteristics, such as terms in the listing title, the listing address, the listing phone number, the listing website, and the like. The frequency data may be separated into time periods, such as daily, weekly, monthly, etc. Frequency data is stored in a data structure, such as a spreadsheet table, for use in determining a usual frequency for a particular characteristic over a particular time period and optionally in a particular geographic region. The usual frequency may be used to identify anomalies in the frequency of a particular characteristic in other time periods. Aspects of the method 500 may also be used to measure frequencies of new listings in a current time period for the purpose of identifying anomalies in the frequency values for a given set of newly added listings.

At stage 502, a set of listings in a particular geographical area is identified. For example, all listings within a particular zip code, city, state, region, or country may be identified for data gathering. Aspects of the method may limit frequency data to a particular region of business listings in order to obtain region-specific frequency data. Region-specific frequency data may be appropriate in order to account for regional variations in business types.

At stage 504, the frequency of each characteristic of the identified business listings are determined. The determination may be performed by counting the number of times a particular characteristic appears in the set of business listings. For example, each time the word "Gaga" appears in one of the business listings, a counter associated with the word may be incremented.

At stage 506, the normal frequency for each characteristic is identified. This identification process may be determined by organizing the business listings into a series of time ranges reflecting when each listing was added. For example, listings added over a period of 5 weeks may be separated into 5 time ranges, each time range associated with a particular week. A frequency value for a particular week may reflect the number of times each characteristic appears in the business listings added during that week. Data from each week may then be used to determine a "normal" frequency. The normal frequency may be a mean, a median, or a mode of the frequency values of each week of data, or any other method of determining a representative value for the normal number of appearances of the particular characteristic in a given week.

At stage 508, the normal frequency of the characteristic is stored within a data set, such as a spreadsheet table. The normal frequency of the characteristic may then be used to identify anomalous frequencies for the particular characteristic in later data sets. Aspects of the method may also store frequency data indexed by time period, such as storing the last 5 weeks of characteristic frequency data, the last 6 months of characteristic frequency data, or the characteristic frequency data as measured over any other period of time. The normal frequency may be used as a base value for the number of times the particular characteristic is typically found in new listings added to the business listing server 104 for the time period over which the normal frequency is measured.

Figure 6:
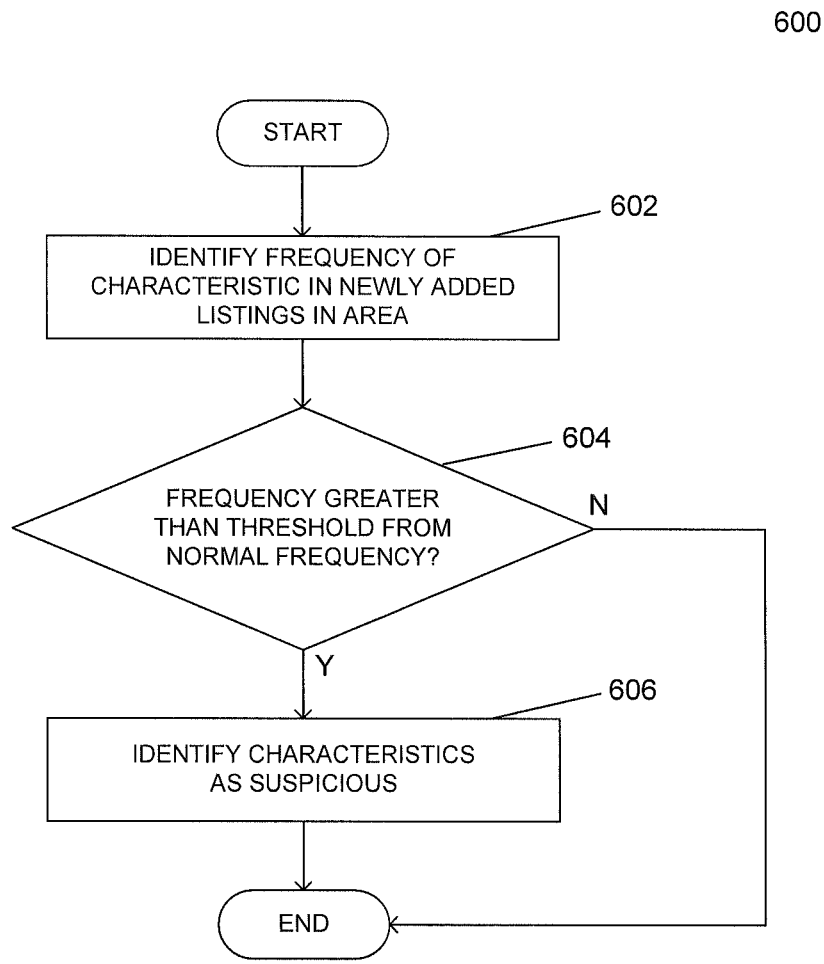
FIG. 6 is a flow diagram depicting an example of a method for identifying a suspicious characteristic in accordance with aspects of the disclosure.

FIG. 6 is a flow diagram depicting an example of a method 600 for identifying a suspicious characteristic in accordance with aspects of the disclosure. The method 600 is operable to analyze frequency data for business listings and to determine when the frequency of a particular characteristic is anomalous. Businesses in a particular geographical area will naturally open and close over time. As new businesses open, new listings will be added to the business listing server 104. While growth is expected over time, a sudden increase in the number of new businesses in a given area is a rare occurrence. In particular, a sudden increase in businesses having similar characteristics (e.g., similar titles, phone numbers, or websites) should be exceptionally rare. As such, an increase in the frequency of a particular characteristic within newly added business listings is indicative of a suspicious characteristic. The method 600 operates to identify these suspicious characteristics by measuring the frequency of characteristics of newly added listings and comparing that frequency with the normal frequency of the characteristic derived from historical data.

At stage 602, the frequency of a characteristic of newly added listings is determined. These newly added listings may be associated with a particular geographical area, as described above. The new frequency value may be calculated for characteristics associated with the newly added business listings within a particular time frame, such as over the course of a day, a week, a month, or any other time period. The time period may be the same length as the time period associated with a normal frequency value for the characteristic. In some aspects, the normal frequency value may be calibrated for use with the time period analyzed by the method 600 (e.g., if characteristics over a two week period are analyzed by the method 600 and the normal frequency value is measured over a one week period, the normal frequency value would be doubled to calibrate to the two week period), or vice-versa.

At stage 604, the new frequency value of the characteristic within the newly added listings is compared to the normal frequency. If the new frequency is greater than a threshold deviation from the normal frequency, then the characteristic may be identified as anomalous. For example, if the term "Gaga" typically appears 7 times per week in a given geographical area, if the term appears 85 times over the last week, this may indicate an anomaly. Anomalies may be determined using various thresholds. For example, the threshold may be an absolute difference between the new frequency and the normal frequency, a relative difference between the new and normal frequency, a deviation from the normal frequency (e.g., the new frequency is greater than two standard deviations from the values used to determine the normal frequency), or any other statistical method of identifying unusual or anomalous data spikes.

At stage 606, if the difference between the new frequency and the normal frequency is greater than the threshold, the characteristic is identified as a suspicious characteristic. Suspicious characteristics may be used to identify spam business listings (see FIG. 7). The method 700 may be repeated for all characteristics associated with the newly added business listings, thus establishing a list of suspicious characteristics for the given time period that is analyzed.

In some aspects, further analysis may be performed on the suspicious characteristics once the characteristics are identified. For example, a particular website or phone number may be determined to correlate very strongly with spam listings, while a particular suspicious term within a listing title may only correlate strongly with spam listings when present along with another suspicious term. Various heuristics and anti-spam methods may be employed to identify characteristics that are "most suspicious" after the initial use of frequency data to identify a subset of all characteristics as "suspicious."

Figure 7:
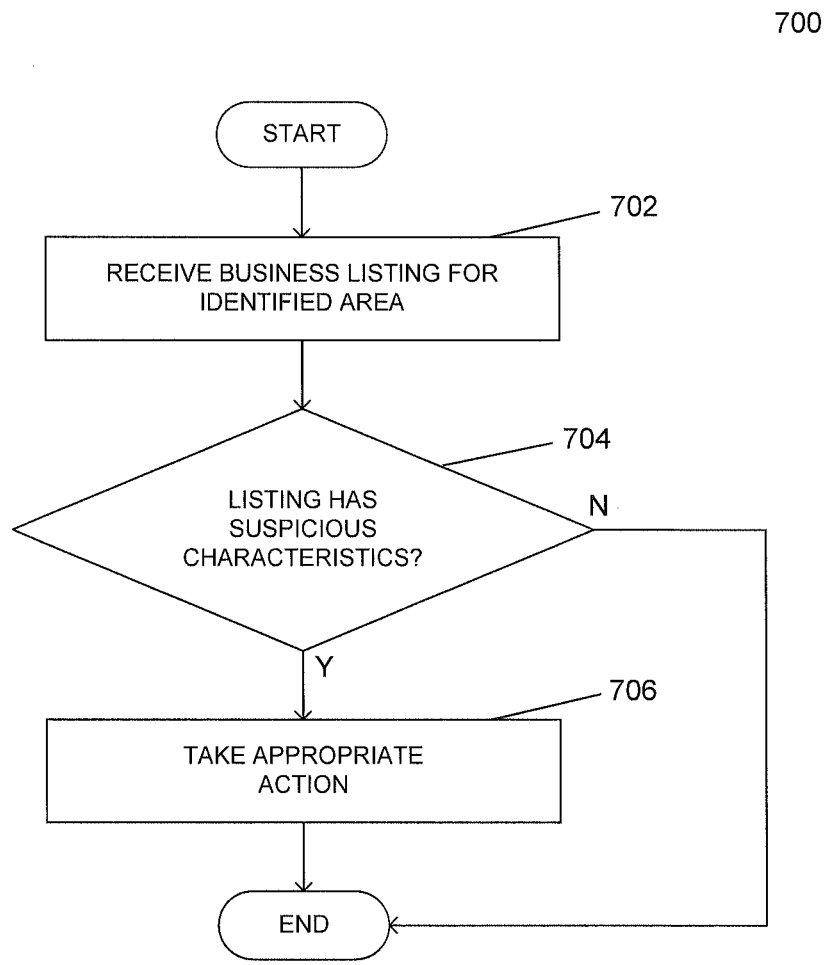
FIG. 7 is a flow diagram depicting an example of a method for identifying spam business listings using suspicious characteristics in accordance with aspects of the disclosure.

FIG. 7 is a flow diagram depicting an example of a method 700 for identifying spam business listings using suspicious characteristics in accordance with aspects of the disclosure. By identifying anomalies in the frequency of various business characteristics, a set of characteristics that are suspicious are identified. These suspicious characteristics tend to indicate that a given business listing may not be legitimate, as they correlate strongly with certain patterns of business listing spam. Thus, by examining listings for these characteristics the method 700 may identify a listing as spam such that appropriate action may be taken.

At stage 702, a new business listing in a particular geographic area is received. For example, a user may upload a new business listing, the method 700 may perform an analysis on all newly added listings, or the method 700 may conduct a periodic review of all listings.

At stage 704, the listing is compared against one or more suspicious characteristics. For example, as described above, the word "Gaga" within the listing title may be identified as a suspicious characteristic. Thus, listings that contain the word "Gaga" in their title might be flagged as likely spam. Other methods of analyzing listings for suspicious characteristics may include identifying the number of suspicious characteristics present within the listing (e.g., greater than some threshold number of suspicious words in the title). In some aspects, the ratio of suspicious words to non-suspicious words may be compared to a threshold value.

At stage 706, appropriate action is taken on listings that have been identified as containing suspicious characteristics. These listings may be flagged for review by a moderator or other manual oversight. In some aspects, listings that are identified as containing suspicious characteristics are marked for analysis by other spam detection methods. In some aspects, a user that has submitted a listing that is identified as containing a suspicious characteristic may be provided with the ability to authenticate the listing, such as via a challenge-response test (e.g., a CAPTCHA) or other method of verifying that the listing was not provided by an automated system.

The stages of the illustrated methods described above are not intended to be limiting. The functionality of the methods may exist in a fewer or greater number of stages than what is shown and, even with the depicted methods, the particular order of events may be different from what is shown in the figures and include additional stages or omit stages as shown.

Aspects of the disclosure advantageously provide for the identification of characteristics of business listings that are indicative of spam business listings. Listings with these suspicious characteristics may be identified as spam listings, or the suspicious characteristics may be used to inform other spam detection methods. In particular, aspects of the disclosure may be suitable to identify situations where many spam listings are submitted within a particular geographic area over a particular period of time.

Although aspects of the disclosure herein have been described with reference to particular aspects, it is to be understood that these aspects are merely illustrative of the principles and applications of the present disclosure. It is therefore to be understood that numerous modifications may be made to the illustrative aspects and that other arrangements may be devised without departing from the spirit and scope of the disclosure as defined by the appended claims. Furthermore, while certain operations and functions are shown in a specific order, they may be performed in a different order unless it is expressly stated otherwise.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer implemented method for identifying business listing characteristics, the method comprising:
   determining, using one or more processors, a first frequency value of a business listing characteristic within a first plurality of business listings over a first time period, wherein the first plurality of business listings are associated with a particular geographical region;
   comparing, by the one or more processors, the first frequency value with a normal frequency value of the business listing characteristic previously determined from a second plurality of business listings over a second time period;
   identifying, by the one or more processors, an anomaly in the first frequency value when a difference between the first frequency value and the normal frequency value is greater than a predetermined threshold; and
   identifying, by the one or more processors, the business listing characteristic as a suspicious characteristic in response to identifying the anomaly, wherein the suspicious characteristic includes at least one term selected from a plurality of terms used in the identified business listing;
   determining, by the one or more processors, that a ratio of the at least one term to other terms from the plurality of terms is greater than a predetermined ratio; and
   identifying, by the one or more processors, the business listing as a spam listing is in response to the ratio being greater than the predetermined ratio.

2. The method of claim 1, further comprising:
   determining that a business listing added to the first plurality of business listings during the first time period contains the suspicious characteristic; and
   performing at least one of:
      marking the business listing for moderator review, identifying the business listing as a spam listing, or marking the business listing to be analyzed by a spam detection method.

3. The method of claim 1, further comprising determining normal plurality of frequency values of the business listing characteristic over a respective plurality of time periods equal to the first time period.

4. The method of claim 3, further comprising determining the normal frequency value of the business listing characteristic by finding at least one of a mean, a median, or a mode of the plurality of frequency values for the respective plurality of time periods.

5. The method of claim 4, wherein the normal frequency value of the business listing characteristic is determined by finding the mean of the plurality of frequency values for the respective plurality of time periods, and wherein identifying an anomaly in the first frequency value when a difference between the first frequency value and the normal frequency value is greater than a predetermined threshold further comprises:
   determining a standard deviation for the normal frequency value; and
   identifying the anomaly when the difference between the first frequency value and the normal frequency value is greater than a predetermined number of standard deviations.

6. A processing system for identifying business listing characteristics, the processing system comprising:
   one or more processors; and
   one or more memories coupled to the one or more processors for storing instructions and a first plurality of business listings, wherein the first plurality of business listings are associated with a particular geographical region;
   wherein the one or more processors are configured to execute the instructions stored in the one or more memories in order to:
      determine a frequency value for a characteristic associated with the first plurality of business listings over a particular time period;
      identify an anomalous frequency value where a difference between the frequency value and a normal frequency value previously determined for the characteristic from a second plurality of business listings is greater than a predetermined threshold; and
      in response to identifying the anomalous frequency value, identify the characteristic as a suspicious characteristic, wherein the suspicious characteristic includes at least one term selected from a plurality of terms used in the identified business listing;

determine that a ratio of the at least one term to other terms from the plurality of terms is greater than a predetermined ratio; and identify the business listing as a spam listing is in response to the ratio being greater than the predetermined ratio.

7. The processing system of claim 6, wherein the one or more processors are further configured to determine normal plurality of frequency values of the business listing characteristic over a respective plurality of time periods.

8. The processing system of claim 7, wherein the one or more processor are further configured to determine the normal frequency value of the business listing characteristic by finding at least one of a mean, a median, or a mode of the plurality of frequency values for the respective plurality of time periods.

9. The processing system of claim 8, wherein the normal frequency value of the business listing characteristic is determined by finding the mean of the plurality of frequency values for the respective plurality of time periods, and wherein identifying an anomalous value in the first frequency value when a difference between the first frequency value and the normal frequency value is greater than a predetermined threshold further comprises:

determining a standard deviation for the normal frequency value; and identifying the anomalous value when the difference between the first frequency value and the normal frequency value is greater than a predetermined number of standard deviations.

10. A non-transitory computer readable storage medium containing instructions that, when executed by one or more processors, cause the one or more processors to perform a method, the method comprising:

determining a first frequency value of a business listing characteristic within a first plurality of business listings over a first time period, wherein the first plurality of business listings are associated with a particular geographical region;

comparing the first frequency value with a normal frequency value of the business listing characteristic previously determined from a second plurality of business listings over a second time period;

identifying an anomaly in the first frequency value when a difference between the first frequency value and the normal frequency value is greater than a predetermined threshold; and identifying the business listing characteristic as a suspicious characteristic in response to identifying the anomaly, wherein the suspicious characteristic includes at least one term selected from a plurality of terms used in the identified business listing;

determining that a ratio of the at least one term to other terms from the plurality of terms is greater than a predetermined ratio; and identifying the business listing as a spam listing is in response to the ratio being greater than the predetermined ratio.

11. The non-transitory computer readable storage medium of claim 10, wherein the method further comprises:

determining that a business listing added to the first plurality of business listings during the first time period contains a suspicious characteristic; and performing at least one of: marking the business listing for moderator review, identifying the business listing as a spam listing, or marking the business listing to be analyzed by a spam detection method.

* * * * *